US007237010B2

(12) United States Patent
Mora

(10) Patent No.: US 7,237,010 B2
(45) Date of Patent: Jun. 26, 2007

(54) METHOD, SYSTEM AND COMPUTER PROGRAM PRODUCT FOR GENERATING AND PROCESSING A DISPOSABLE EMAIL ADDRESS

(75) Inventor: Frederic Mora, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 10/803,829

(22) Filed: Mar. 18, 2004

(65) Prior Publication Data

US 2005/0210107 A1 Sep. 22, 2005

(51) Int. Cl.
*G06F 15/16* (2006.01)
(52) U.S. Cl. .................... 709/206; 709/203
(58) Field of Classification Search ............... 709/203, 709/206
See application file for complete search history.

(56) References Cited

U.S. PATENT DOCUMENTS

| | | | | | |
|---|---|---|---|---|---|
| 5,930,479 | A | * | 7/1999 | Hall | 709/206 |
| 5,999,967 | A | * | 12/1999 | Sundsted | 709/206 |
| 6,097,797 | A | * | 8/2000 | Oseto | 358/402 |
| 6,266,692 | B1 | * | 7/2001 | Greenstein | 709/206 |
| 6,349,299 | B1 | | 2/2002 | Spencer et al. | 707/10 |
| 6,546,416 | B1 | * | 4/2003 | Kirsch | 709/206 |
| 6,584,564 | B2 | | 6/2003 | Olkin et al. | 713/152 |
| 6,604,132 | B1 | * | 8/2003 | Hitt | 709/206 |
| 6,708,205 | B2 | * | 3/2004 | Sheldon et al. | 709/206 |
| 6,993,574 | B2 | * | 1/2006 | Hall | 709/207 |
| 7,054,906 | B2 | * | 5/2006 | Levosky | 709/206 |
| 2001/0049723 | A1 | * | 12/2001 | Dean | 709/206 |
| 2002/0129111 | A1 | | 9/2002 | Cooper | 709/207 |
| 2003/0046533 | A1 | | 3/2003 | Olkin et al. | 713/152 |
| 2004/0201625 | A1 | * | 10/2004 | Karamchedu et al. | 345/752 |

FOREIGN PATENT DOCUMENTS

| | | |
|---|---|---|
| JP | 10042058 A | 2/1998 |
| JP | 10042065 A | 2/1998 |

OTHER PUBLICATIONS

"Spamgourmet—Frequently Asked Questions", http://web.archive.org/web/20030829060941/spamgourmet.com/disposableemail.pl?printpage=faq.htm, Archive date: Aug. 29, 2003, [Access date: Nov. 5, 2006].*

(Continued)

*Primary Examiner*—Ario Etienne
*Assistant Examiner*—Ramy M Osman
(74) *Attorney, Agent, or Firm*—Eugene I. Shkurko, Esq.; Kevin P. Radigan, Esq.; Heslin Rothenberg Farley & Mesiti, P.C.

(57) ABSTRACT

Disposable email address generation, and processing thereof at a disposable address system are provided. The generated disposable email address includes a hostname domain, a username, a domain tag, and a passcode, wherein the passcode is selected by a user employing a user chosen algorithm of a plurality of passcode validation algorithms provided to the user by the disposable address system. The user chosen algorithm for generating the passcode can be periodically changed for different disposable email addresses owned by the user. The disposable address system includes storage for holding an indication of revocation of a compromised disposable email address to prevent future emails with that destination email address from being forwarded to the user owning the email address.

34 Claims, 6 Drawing Sheets

OTHER PUBLICATIONS

Rose, et al., "Current Technological Impediments to B2C Electronic Commerce", Communications of the Association for Information Systems, vol. 1, Article 16, Jun. 1999.

http://www.spamgourmet.com/disposableemail.pl?printpage=faq.html, Mar. 8, 2004, pp. 1-10.

http://sneakemail.com/info.pl?sel=example, Mar. 8, 2004, pp. 1-2.

IBM Manual SA22-7802-04 entitled z/OS UNIX System Services Command Reference, Fourth Edition, Sep. 2002, pp. 805-809.

* cited by examiner

METHOD, SYSTEM AND COMPUTER PROGRAM PRODUCT FOR GENERATING AND PROCESSING A DISPOSABLE EMAIL ADDRESS

TECHNICAL FIELD

The present invention is directed toward processing of electronic mail (or email), and more particularly, to email address construction and processing protocol for implementing disposable, traceable email addresses employing a user-selected passcode validation algorithm(s) to facilitate reduction in unsolicited mass email received from mass-mailers.

BACKGROUND OF THE INVENTION

Electronic mail or email was historically one of the very first applications of the Internet. Internet users are now facing a growing problem: Unsolicited Mass Email (UME). UME is defined as email messages that are sent in very large quantities to as many recipients as possible, regardless of the desire of the recipients to receive these messages. The senders of UME, hereafter called mass-mailers, typically ignore requests to be removed from future mass mailings.

Mass-mailers collect email addresses from several sources, including:

1. The Internet: recipients often post their addresses on web sites or in online forums, where mass-mailers collect them with special tools dubbed "address harvesters".

2. Promotional web sites: recipients are enticed to enter their email address for a chance to win a small prize, if any, and are thereafter included in mass-mailers' address lists.

3. Legitimate contact lists: some companies periodically sell name and email addresses of potential prospects. Address and contact lists are also part of the assets that are liquidated when a company goes bankrupt. Mass-mailers buy these email addresses and resell them to other mass-mailers.

Once an email address has been included in a list used by a mass-mailer, it is often quickly resold and used by many other mass-mailers. The recipient will receive an ever-larger amount of UME. Such an email address is said to be compromised.

Protecting one's email address from being compromised through methods 1 and 2 is relatively easy (i.e., don't post your email address and don't give it to unknown entities). However, method 3 is impossible to avoid with the current email system. Corporate workers must often give their email address to contacts, suppliers, customers and other entities or persons outside their company, each of which can potentially disseminate these addresses and add them to mass-mailing lists.

Current solutions to the UME problem are unsatisfactory and often impractical for the business world, if not for most email users. These solutions include the following.

1. Filtering known UME senders. This doesn't work well because mass-mailers often forge their sender address (i.e., the "From:" field).

2. Filtering all unknown senders (a.k.a. "white listing"). This is not practical because business recipients often receive emails from new contacts, for example after initiating communication across the telephone or in person.

3. UME detection (a.k.a "message matching"). This method employs several email addresses that are posted on the Internet for the express purpose of being harvested by mass-mailers to be compromised. The idea is that if these email addresses receive a message, that message will be UME, and all similar email messages can be tagged as UME. However, mass-mailers are sprinkling messages with random parts, adding or changing character strings in individual messages, which can defeat message matching systems.

4. Filtering on content. Most UME contain "trigger words" that can be detected by filtering software. For instance, "mortgage" is unlikely to show up in your professional email if you aren't in the real estate business, but it is frequent in UME messages. This filtering can be quite efficient. However, recent trends in UME show that mass-mailers avoid trigger words by misspelling or altering them (e.g., "m0rtgage" or m:or.t.gage" instead of "mortgage"), which decreases the filters' efficiency. Other mass-mailers fool naive filtering software by inserting comments within HTML messages to break trigger words (e.g., "mo<!--ZZZZ-->rtgage"). Note that this insertion of useless strings in the UME messages also tends to increase their average size.

5. Adaptative filtering. Adaptative filters can be taught to recognize the format and layout of UME messages, which often rely on HTML formatting with several images. However, legitimate emails containing genuine press releases and newsletters are now as likely to be filtered as UME. Besides, mass-mailers have started sending UME with Javascript encoding as well as UME entirely composed of one or more images, which cannot be filtered on content. These Javascript-encoded and image-based UME message are of ever-increasing sizes.

Other problems with existing anti-UME solutions include:

1. Client-location filtering is not a good solution. When filtering is done on the client side, UME is sent to the recipient's machine, only to be discarded by the recipient's mail agent. Meanwhile, the network connection of the recipient's machine is clogged by UME. When the recipient must download email using a slow dial-up connection (e.g., when the recipient is away from a corporate office equipped with high-speed networking), the time wasted downloading UME can be significant.

2. Wireless devices. A growing number of portable devices offer to receive email wirelessly. The service providers generally sell wireless connectivity by the hour or by the megabyte. When an email address connected to one of these devices is compromised, it is a real problem because the recipient must then download UME on a slow and expensive connection. Even if an UME message is identified as such, it still has to be downloaded.

In summary, existing filtering systems typically require emails to be downloaded and processed. A lot of corporate filtering systems are server based, but they merely identify UME messages and tag them as such, clogging the mailbox and network connection of the corporate recipient.

SUMMARY OF THE INVENTION

Within a corporate network, each email user has at least one mailbox, that is, a repository from which the user downloads or views email messages. The mailbox accepts all email messages sent from within the corporation. In a conventional email system, this email address also accepts messages from outside the corporation. The internal and external email addresses are thus the same.

In the approach proposed herein, external email addresses are different. Each email user maintains a pool of disposable email addresses, all going to the same internal mailbox. Each disposable address is given to a small number of entities (ideally only one). The email server is interfaced with a new subsystem, referred to herein as the Disposable Address System or Server (DAS). The DAS can be implemented as a set of programs interfaced with the corporate email server.

When an address starts receiving UME, the recipient can revoke the address, since the address is considered compromised. If the address has been given to a single entity (i.e., email sender), this entity is considered a source of UME, and corporate policies for dealing which such entities can be activated. If the address has been given to more than one entity, each entity can be informed automatically that the recipient's address is changing to a new one, and each entity can be given a separate disposable address, with the DAS remembering which disposable address is provided to which sender.

Good disposable addresses can be given verbally (e.g., provided over the phone), and are preferably unique for each sender entity. Since a user does not always necessarily expect to have to provide a disposable email address, the user should be able to generate a new disposable email address on-the-fly (i.e., on demand) without requiring pre-registration with the DAS, and that disposable address can be unique for each potential sender (i.e., sender domain).

Although there are disposable email systems available today, most are implemented as web sites targeted toward individual home users. These systems provide two kind of disposable addresses:

Pre-registered disposable addresses, where a user has to create and register a new disposable address before it can be given to a potential sender, which is not always possible; and On-the-fly disposable addresses. This is the type that the DAS disclosed herein allows for.

Presented herein, in one aspect, is a method of generating a disposable email address which includes: constructing a disposable email address as including a hostname domain, a username, a domain tag, and a passcode, wherein the username identifies a user owning the disposable email address at the hostname domain and the domain tag identifies an email sender domain to which the disposable email address is to be given for use in forwarding email from the sender domain to the user at the hostname domain; and selecting by the user the passcode for the disposable email address using a user chosen algorithm of a plurality of passcode validation algorithms provided to the user.

In another aspect, a method of constructing and processing a disposable email address is provided. The email address comprises a hostname domain, a username, a domain tag and a passcode. The method includes: generating a disposable email address by the user and forwarding the disposable email address to a sender domain, wherein a domain tag in the disposable email address identifies the sender domain to which the disposable email address is forwarded, and wherein the generating comprises selecting by the user a passcode for the disposable email address using a user chosen algorithm of a plurality of passcode validation algorithms provided to the user by a disposable address system; determining whether the disposable email address associated with an email received at the disposable address system is valid, and if so, delivering the email to a user at the hostname domain owning the disposable email address; noting by the user that the email associated with the disposable email address comprises an unsolicited mass email and informing the disposable address system that the disposable email address has been compromised; and indicating revocation of the comprised disposable email address at the disposable address system to prevent future emails sent to that disposable email address from being forwarded to the user by the disposable address system.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
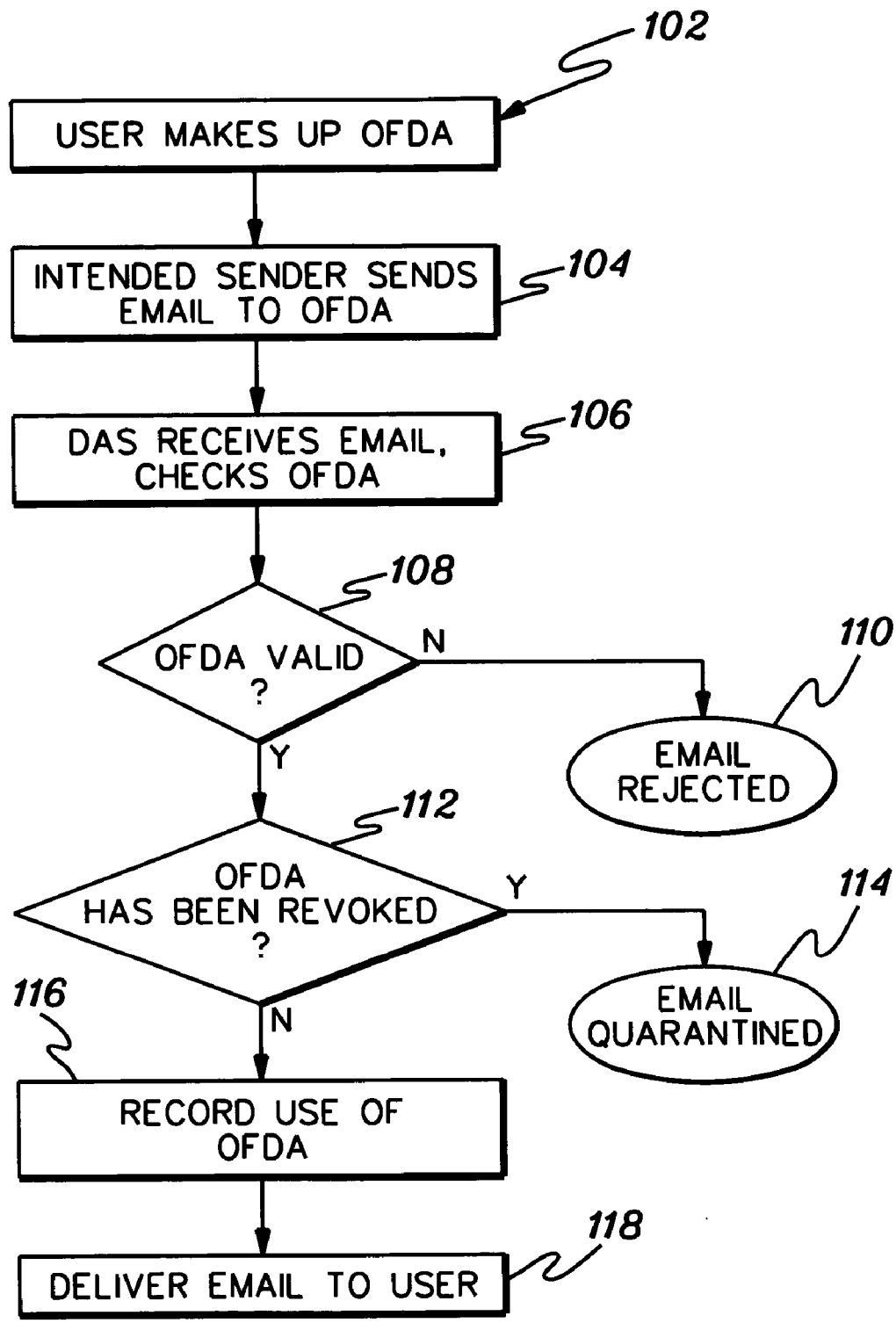
FIG. 1 is a flowchart of one embodiment of processing an On-the-Fly Disposable email Address (OFDA) associated with an email received from a sender at a Disposable Address System (DAS), in accordance with an aspect of the present invention.

Generally stated, presented herein are novel selection and processing protocols for implementing disposable, traceable email addresses, also referred to herein as on-the-fly disposable addresses (OFDAs). The data structure of an OFDA disclosed herein includes a hostname domain, a username, a domain tag, and a passcode, wherein the username identifies a user owning the disposable email address at the hostname domain and the domain tag identifies an email sender domain to which the disposable email address is to be provided for use in forwarding email from the sender domain to the user at the hostname domain. The user is allowed the flexibility to select the passcode (e.g., on-the-fly) using an algorithm of a plurality of passcode validation algorithms defined to the use by the disposable address system or server (DAS). The DAS typically provides email interface functions for a plurality of clients or users at the hostname domain, for example, for the employees of a corporation.

The DAS receives from a sender an email directed to a disposable email address, and determines whether the address is valid. If the address is valid, the DAS delivers the email to the user owning that disposable email address. The user may then identify the email as an unsolicited mass email (UME) and inform the DAS that the disposable email address has been compromised. The DAS can then record revocation of the disposable email address to prevent future emails with that address from being forwarded to the user through the disposable address system. The above-summarized aspects of the present invention are described in greater detail below.

Disposable Address System

In an on-the-fly disposable address (OFDA) system such as proposed herein, each user has a set of addresses that are all forwarded to the same mailbox. Like every Internet email address, an OFDA includes two parts, the mailbox ID and the host name, written as:

mailboxID@hostname

The hostname is a so-called Fully Qualified Domain Name (e.g. mail.ibm.com) of the mail server.

the mailbox ID is, in turn, composed of several parts:
the username, which identify the user owning the mailbox. The username is unique for the recipient.
the domain tag (or sendername), which identifies the sender to which the OFDA is given. This tag is allocated by the user.
the passcode, which is a string required in every OFDA.

Consider Spamgourmet.com, an existing free OFDA system. Each of its addresses is of the type prefix.sendername.number.username@spamgourmet.com, where sendername and username are the same as described above, number is the maximum number of messages receivable in the mailbox before it expires, and prefix is a string containing a passcode.

The problem is that this system does not enforce a non-empty passcode. A large proportion of the usernames are easily guessable since they are made of common first and last names. As a result, if this kind of OFDA was to become common, it would represent a tempting, unprotected target for mass-mailers.

All email systems, including the OFDA type, are susceptible to and must protect against dictionary attacks. In this attack, a mass-mailer targets a mail server and uses a computer program to generate millions of usernames by combining common first and last names, and possibly initials and numerical suffixes. The mass-mailer hopes that a certain proportion of the random combinations will match existing usernames. Hence, a mandatory hard-to-guess passcode is important to deter this kind of attack.

Experience with disposable address systems shows that mass-mailers will attempt to saturate these systems with invalid messages. More precisely, if the system uses fixed passcodes, the database used to store the disposable addresses associated with each user can be saturated by millions of addresses created by a mass-mailer. This is a form of Denial of Service attack.

Hence, a key to a robust, tamper-resistant disposable address system is good passcodes. Such passcodes can be allocated with any kind of granularity, for example, a user could use the same passcode for all disposable addresses. However, since a user exposes a passcode each time a disposable address is divulged, the user should use different passcodes for different contacts (i.e, senders).

Ideally, the user will use a different passcode for each sender domain. However, most users would find that inconvenient. Practically, the invention disclosed herein gives users a method to generate passcodes that can be changed periodically without having to change the setup of the user's DAS account.

In one aspect, the invention disclosed herein gives each user a list of algorithms used to validate passcodes. A user can pick one or more algorithm(s) and change a currently used algorithm. As one example, Passcode Validation Algorithms (PVAS) are defined in an XML language instead of being fixed, which allows advanced users, or administrators of the DAS, to add new algorithms to the list.

This way, users can pick the method of passcode creation that best suits them, which is key to insuring that the system will be adopted. Beginners might select basic password methods (e.g. "six letters and one number at the end"), while more experienced users might choose harder to guess passcodes ("seven letters, at most two vowels, followed by a 3-digit number between 600 and 799").

The proposed disposable address system (DAS) can be implemented as a server (e.g., a web interface), which can be accessed from within a deployment site (e.g., on a corporate Intranet server or by clients of an Internet Service Provider).

The DAS has two types of access:
user access. Users access the DAS through a general network client interface (e.g., web browser) and can:
list the OFDAs of messages sent to their mailboxes
revoke individual OFDAs
revoke OFDAs matching certain criteria (e.g. date of creation, entity to which the OFDA was given, etc.)
change the algorithm used by the DAS to validate the user's passcodes
administrator access. A DAS administrator can:
list or revoke the OFDAs created by all users
alter the authorizations of a user
list or revoke the OFDA used by certain senders (e.g., revoke all OFDAs used by SomeFirm.com if the administrator has knowledge that these OFDAs start receiving UME).

Disposable Email Address Structure

Recall that every Internet email address is of the form:
mailboxID@hostname

The hostname is determined by the mail server's fully-qualified domain name. As for the mailbox ID, define a function $M(U, S, P)$ returning the mailbox ID M for any valid string triplet U (the username), S (the sendername (i.e., domain tag)), and P (the passcode). M is a string created by juxtaposition of U, S and P, possibly with a separator (the separator is a character not allowed in the U, S and P strings). For instance, $M(U,S, P)$ can be U.S.P or S-P-U or any other combination.

Each user has a username U, which can be the user's name and initials, e.g. jdoe. When the user wants to give a disposable address to a contact, the user needs two more strings: the sender domain tag S and the passcode P.

S identifies the entity to which the disposable address is to be given. If the contact is a firm, S can be the firm's corporate domain name such as SomeFirm.com. However, S can contain any string as long as the user ensures separate entities have separate domain tags in the user's own nomenclature.

Passcode P should be capable of being generated on-the-fly, and should satisfy the following requirements:
  accepted by the user's DAS to avoid rejecting legitimate emails;
  easy for the user to generate on-the-fly; and
  be not constant, in order to avoid Denial of Service attacks.

The proposed disposable address selection protocol disclosed herein offers users a configurable set of methods for creating passcodes that meet the above requirements.

Passcode Validation Algorithms

When a user sets up an account on a workplace DAS, the user is given a list of passcode validation algorithms (PVAs) that can be used to validate the passcodes the user chooses when the user divulges a disposable address. The algorithms can range from simple to more complex, in order to suit individual preferences. Examples of PVAs include:
1. "Passcode must contain a y and a z". A valid passcode is "hyphenize".
2. "Passcode must be at least six characters long and contain exactly two vowels and a number". For this algorithm, a valid passcode is "paint1234"
3. "Passcode must be at least 7 characters, contain an odd number and three consonants". For this PVA, a valid passcode is "ea781sels"
4. "Passcode must be at least 6 letters and a number between 1000 and 2000, with no repeated character". For this PVA, a valid passcode is "brush1324tip".

Some of these PVAs are trivial and will not be deemed suitable. However, PVAs are not fixed. Each DAS can have its own set of PVAs, on a per-site basis. Moreover, the DAS lets each user pick one or more PVAs for validating the passcodes the user generates. Thus, the user can switch between algorithms as desired.

As one example, presented herein is an XML language implementation for describing the PVAs. The language is referred to herein as PVADL (Passcode Validation Algorithm Description Language).

PVADL is based on the syntax of the existing Expression Language, part of the Java J2EE 1.4 specification. Reference "Core JSTL: Mastering the JSP Standard Tag Library", by David M. Geary, Prentice Hall PTR, 2002, ISBN: 0131001531, the entirety of which is hereby incorporated herein by reference. See below for a more detailed description of PVADL.

Suitable PVAs are itemized in a list of predefined algorithms by the administrators of the DAS. The predefined PVAs can be packaged with the DAS software as a library of PVADL files. More PVAs can also be written in PVADL, either by the administrators or by users authorized to do so.

A draft PVADL syntax is presented below.

In one embodiment of the proposed system, each PVA is implemented as a PVADL file. This PVADL file can be transformed into a parseable expression. The expression is equivalent to a program that, for each input string, gives a binary output: accept (the passcode satisfies the algorithm) or fail. A good PVA should not accept the random strings generated by mass-mailer programs attempting a Denial of Service attack.

Before a PVA is considered for acceptance, it can optionally be tested against simulated attacks by a Monte-Carlo analysis. The goal of this analysis is to check that the PVA will not accidentally validate random strings. A simulation module creates random strings made of separate characters and words from dictionaries. Each string is then given to the tested PVA.

If the PVA accepts only a very small fraction of the random strings, it is deemed resilient and will be considered for acceptance in the DAS. The "small fraction" criterion is of course arbitrary. A reasonable value is 0.1%, or 1 per 1000 random string accepted.

For instance, a dictionary of 45,425 English words is combined with random integers between 1 and 1000, for a total of more than 45 million combination strings. These strings are evaluated by the PVA expression matching the rule "at least nine letters, with exactly two vowels, and a 2-digit even number". The English dictionary contains 508 words of 9 letters or more with two vowels. The interval from 1 to 1000 contains 45 two-digit even numbers. The total matching combination count is 45×508=22860, or 0.05% of the 45 million random strings. This rate is low enough to be a good deterrent against dictionary attacks. The rule is thus deemed acceptable.

DAS Processing Protocol and Data Structures

In operation, a user coupled to a DAS initially creates a disposable email address (i.e., an OFDA) 102, and provides the OFDA to a potential email sender. The OFDA can be provided either verbally or in writing (see FIG. 1). The intended sender then sends an email to the user using the OFDA 104. All external email to the user passes through the DAS, which receives the email and checks the OFDA associated therewith 106 to determine whether the OFDA is valid 108. If "no", then the email is rejected by the DAS 110. Comparison of the OFDA can be to established tables of user defined OFDA's, for example, by comparing the username, domain tag and passcode within the OFDA with corresponding information in the established tables.

If valid, the DAS determines whether the OFDA has been revoked 112, and if "yes", then the email associated therewith is quarantined 114 for possible discarding, for example, after a cursory examination by an administrator. Assuming that the OFDA has not been revoked, then the DAS records use of the OFDA 116, and delivers the email to the user 118 by, for example, forwarding the email to the user's internal mailbox.

Figure 2:
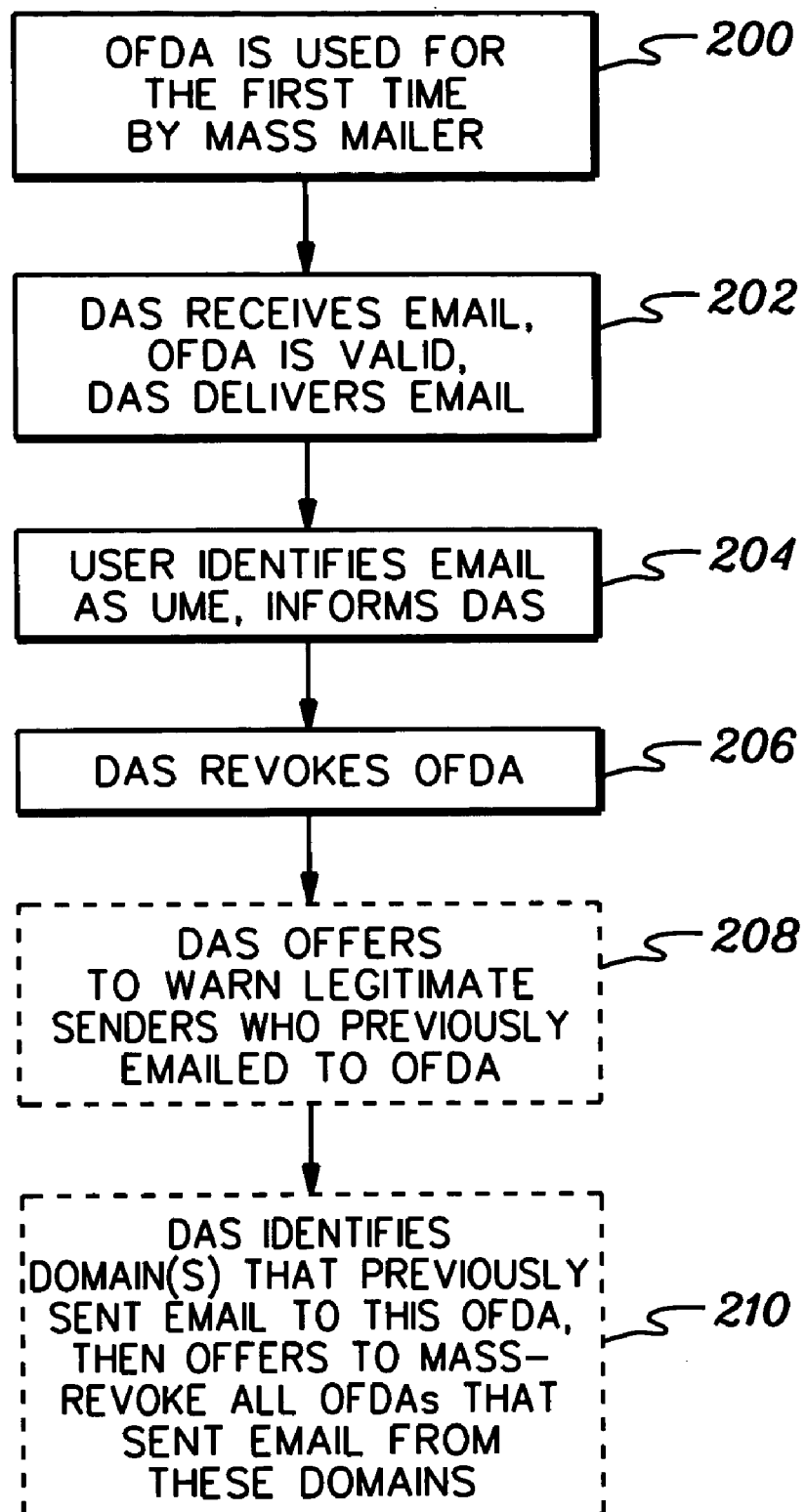
FIG. 2 is a flowchart of one embodiment of processing for detecting a valid OFDA associated with an Unsolicited Mass Email (UME) and for indicating revocation of the OFDA at the DAS, in accordance with an aspect of the present invention.

FIG. 2 depicts one example of processing in accordance with the present invention when there is use of an OFDA by a mass emailer 200. The DAS receives the email and determines that the OFDA is valid resulting in delivery of the email to the user 202. The user identifies the email as an unsolicited mass email and informs the DAS that the OFDA has been compromised 204. The DAS revokes the OFDA by retaining an indication that the disposable email address is no longer valid 206. The DAS may optionally offer to warn legitimate sender domains which previously received the OFDA that the disposable address is no longer valid 208. Further, the DAS may optionally identify sender domains that previously sent email to the OFDA at issue, and offer to mass-revoke other OFDAs associated with email from that particular sender domain(s) 210.

Figure 3A:
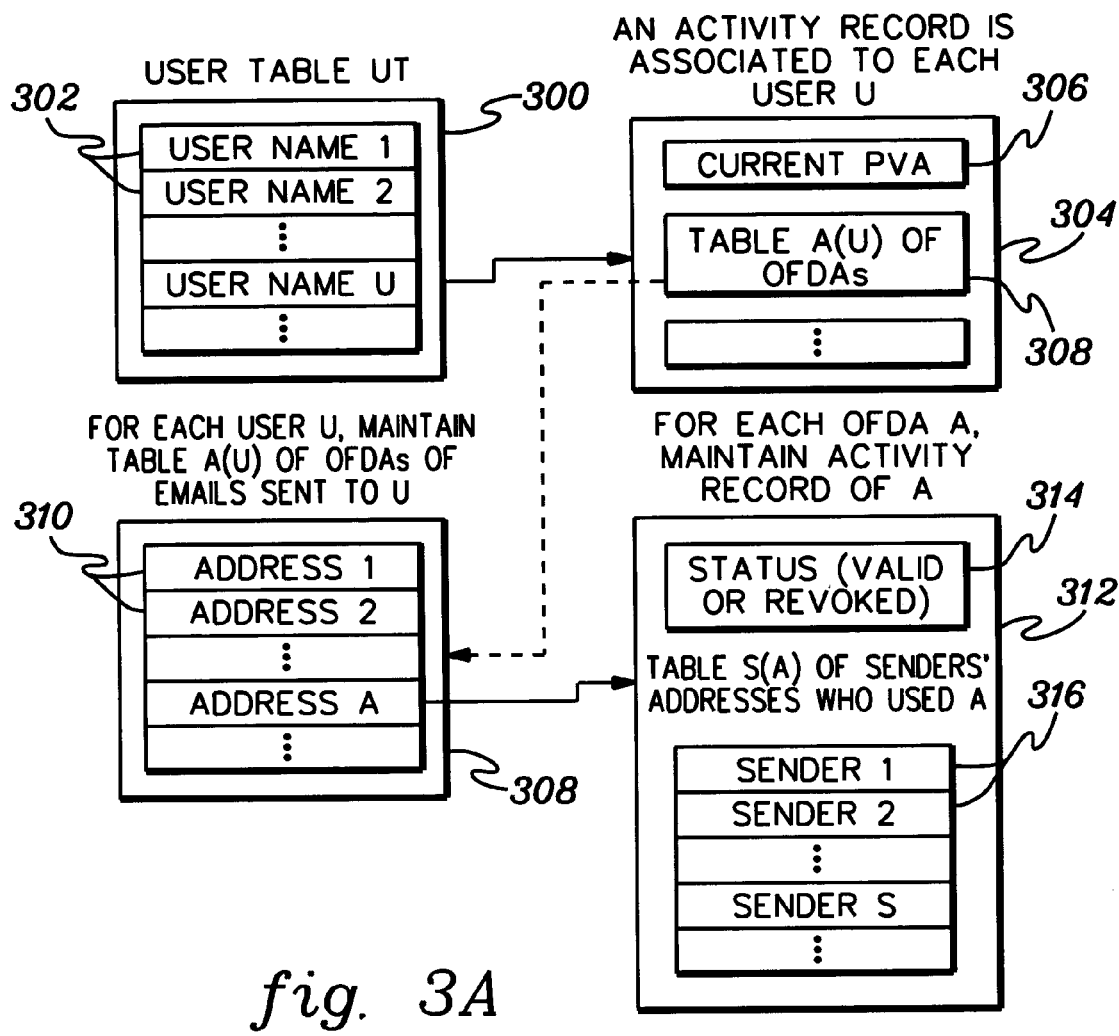
FIG. 3A depicts one data structure embodiment which can be used by a disposable address system (DAS) for recording and tracing disposable email addresses (OFDAs), in accordance with an aspect of the present invention.

In one implementation, the DAS includes a database of disposable addresses generated by users of the system (see FIG. 3A). For example, the database can contain a list of valid usernames 302 in a User Table UT 300. For each user U, the database also contains an activity record 304, including a list A(U) of active disposable addresses A(U) 308, represented by pairs (S, P), created by the user, and the current PVAs 306 chosen by user U. The table A(U) of OFDAs 308 for a particular username includes a list of disposable addresses 310 associated with emails sent to that user. For each OFDA A, an activity record 312 is maintained which includes a table S(A) of senders' addresses having sent email to the particular address 316, and the status of the particular address 314.

Figure 3B:
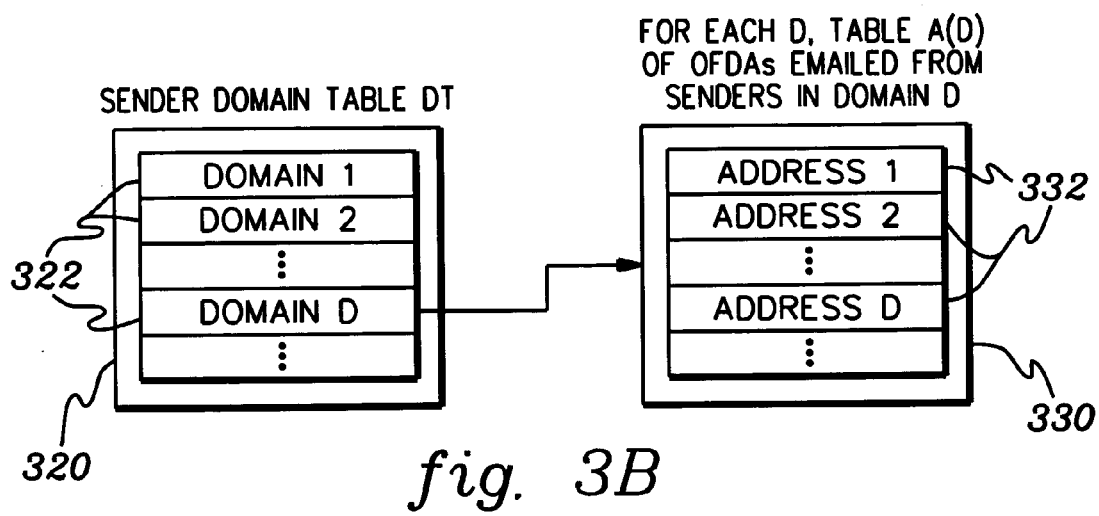
FIG. 3B depicts one data structure embodiment which can be maintained by a disposable address system for recording and tracing sender domain information extracted from disposable email addresses (OFDAs) received at the disposable address system, in accordance with an aspect of the present invention.

As shown in FIG. 3B, independent of the user information, the database may also contain a table of domain names 320 of senders 322 extracted from the SMTP headers of email received by the DAS (e.g., SomeFirm.com). For each domain name D, the database can include a list A(D) 330 of all existing mailboxIDs (addresses) 332 that received messages sent from domain D.

The DAS can also include an attempts log, a journal file or subsystem where suspected UME are logged upon reception. The attempts log includes the mailboxID M(U, S, P), the sending remote email server, possibly the email's "Received:" chain extracted from its SMTP headers, and a timestamp.

Most disposable address systems store a list of disposable addresses for each user. The originality of the proposed system is, in part, that the DAS, in addition, associates the domain name or tag D of a sender with the mailboxID M(U, S, P) of emails sent from this domain. This allows administrators to revoke en masse all the mailboxIDs divulged to a given entity (i.e., sender domain) if this entity starts sending UMEs.

Figure 4:
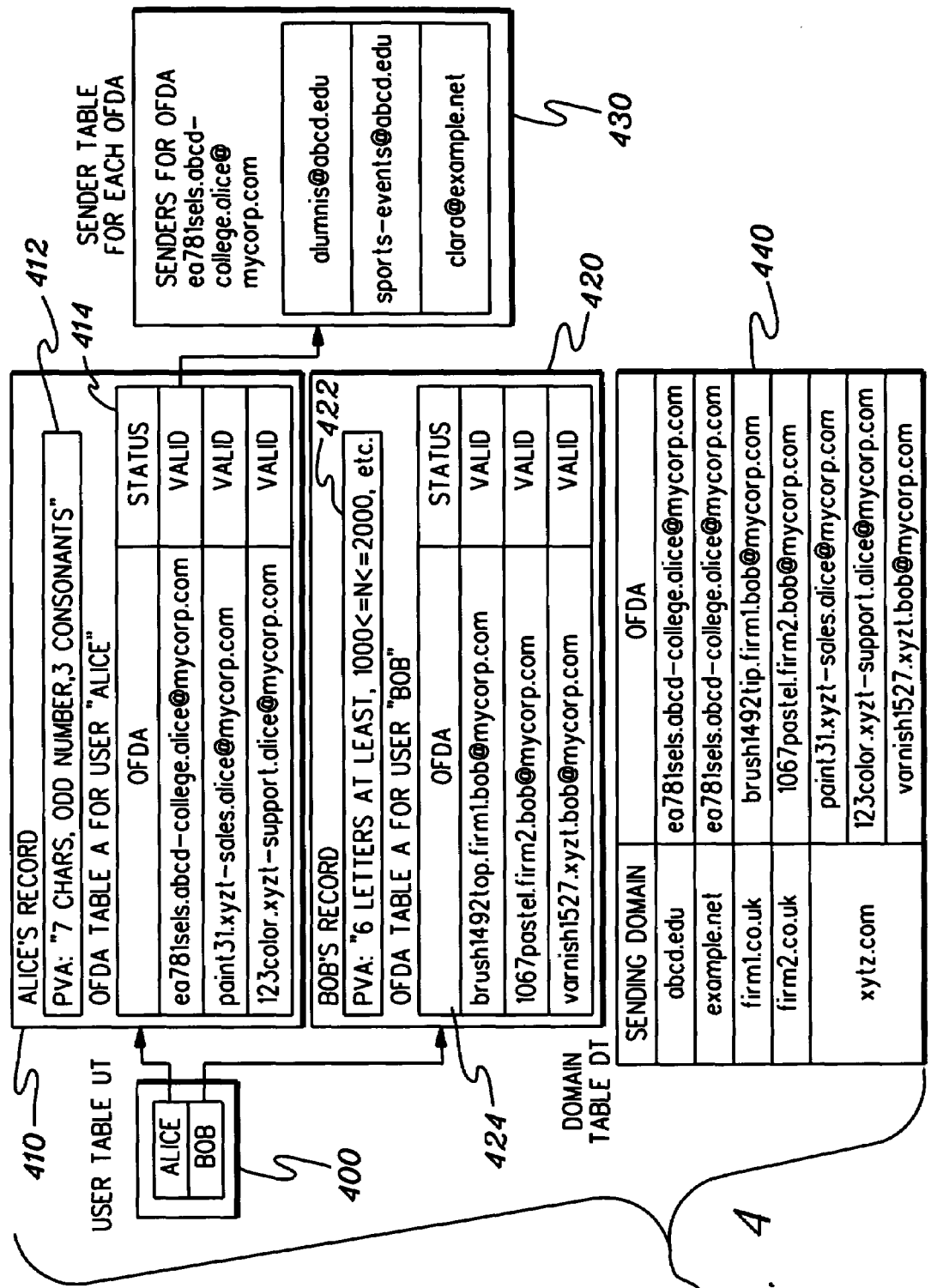
FIG. 4 depicts one example of data structures recorded at a disposable address system for two users of the system, in accordance with an aspect of the present invention.

FIG. 4 depicts one example of the data structures of FIGS. 3A & 3B in use by two senders Alice and Bob. The senders are identified in a user table UT 400. The company name MyCorp receives email in domain mycorp.com. The company has deployed a DAS as disclosed herein and the DAS defines the following structure for an OFDA: passcode.sendertag.username@mycorp.com, where passcode is a user-chosen passcode, sendertag is an arbitrary user-chosen string identifying the sender to whom the user gave the OFDA, and username is the identifier of the user on the DAS.

Alice has selected the following passcode validation algorithm (PVA): "passcode must be at least 7 characters, contain an odd number and 3 consonants" 412 as identified in Alice's record 410. For the PVA, some valid passcodes are ea781sels, paint31, 123color. Alice has created and given OFDAs to various prospective senders. She has received email addressed to the OFDAs identified in record 414. The sender domains from these emails are: abcd.edu and xyzt-.com. Alice gave the first OFDA to two senders, i.e., the Alumni Association and the Athletic Event Mailing List. The alumni list also includes Alice's friend Clara (clara@example.net) who emailed Alice using the same OFDA. The sender table for OFDA ea781sels.abcd-college.alice@mycorp.com is therefore as set forth in table 430.

Similarly, Bob has selected the following PVA "passcode must be at least 6 letters and a number between 1000 and 2000, with no repeated character" 422 as set forth in Bob's record 420. For this PVA, some valid passcodes are brush1492top, 1067pastel, varnish1527. Bob has generated and given various OFDAs and received emails addressed to the OFDAs identified in OFDA table A for user Bob 424.

Each time a user receives an email, the DAS also tracks the sender's domain and lists the information in a domain table DT 440. For each domain, the DAS maintains the sender domain's table with a list of OFDAs emailed by a sender in that domain.

Figure 5:
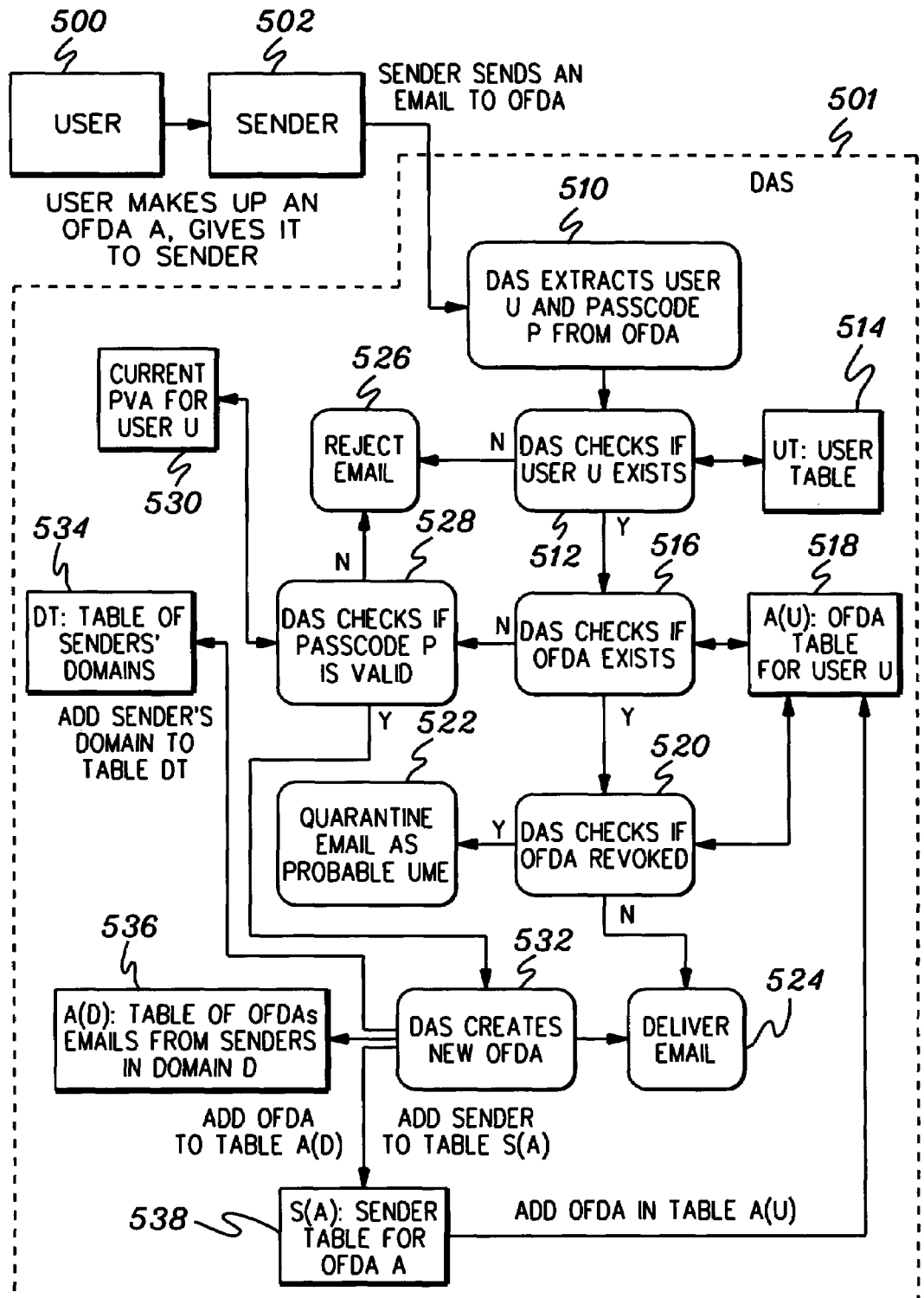
FIG. 5 is a flowchart of one embodiment of DAS protocol for processing a disposable email address using the data structures of FIGS. 3A & 3B, in accordance with an aspect of the present invention.
Figure 6:
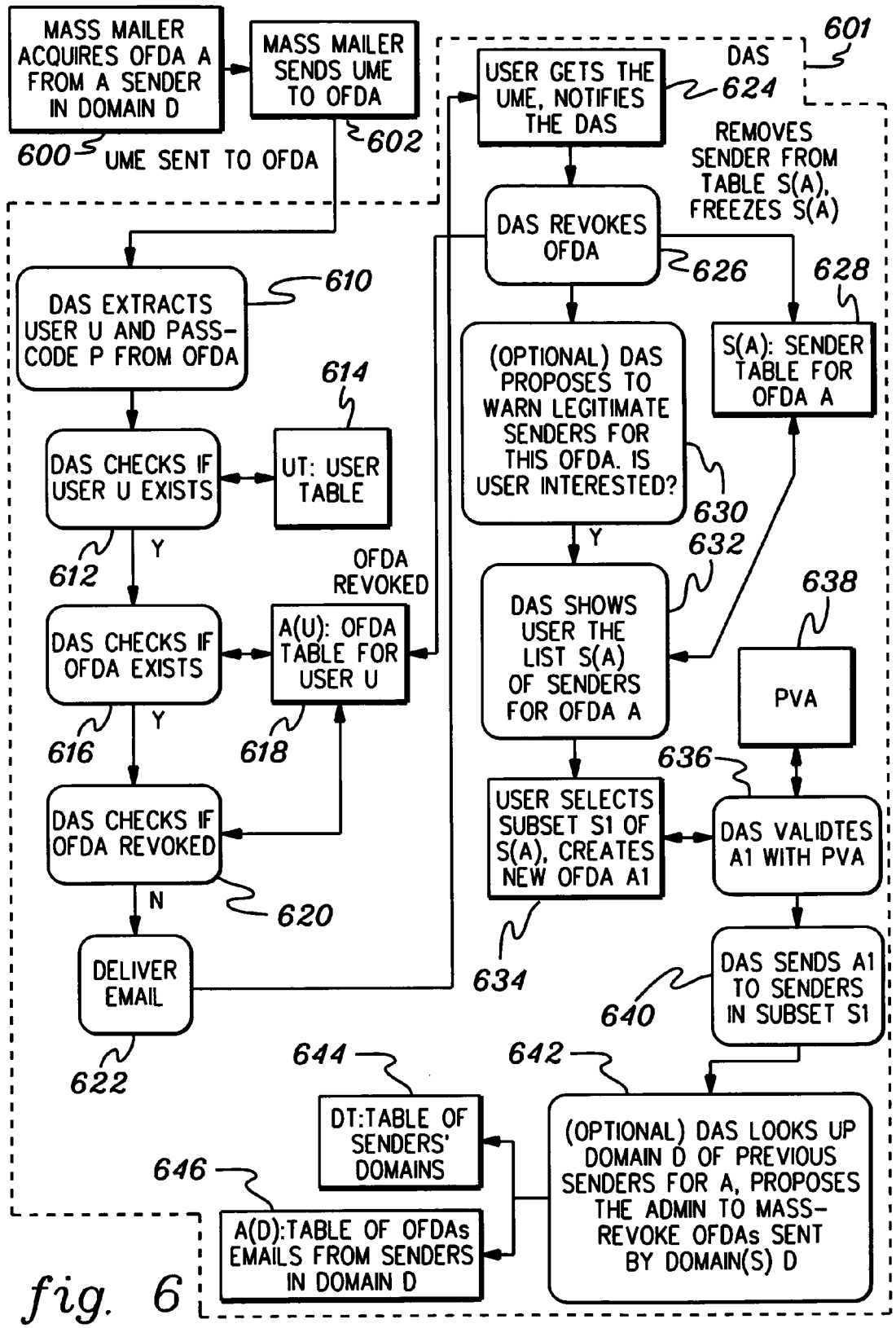
FIG. 6 is a flowchart of one embodiment of DAS protocol for processing a disposable email address using the data structures of FIGS. 3A & 3B, and assuming that a user receives an unsolicited mass email (UME) associated with an OFDA owned by the user, in accordance with an aspect of the present invention.

FIGS. 5 & 6 depict one example of DAS processing protocol in accordance with an aspect of the present invention using data structures such as depicted in FIGS. 3A & 3B. Beginning with FIG. 5, a user 500 generates an OFDA A and provides the disposable email address to a sender 502. The sender forwards an email to the provided OFDA A which is received at the DAS 501. The DAS extracts the username U and passcode P from the OFDA 510 and determines whether the username U exists in its database comprising User Table 514. If "no", then the email is rejected by the DAS 526. Otherwise, the DAS checks to determine whether the OFDA exists 516, which is implemented with reference to the OFDA table for user U 518. If "yes", then the DAS checks to determine whether the OFDA has been revoked 520, and if not, delivers the email to the user 524. If the OFDA has been revoked, then the DAS quarantines the email as a possible UME 522.

Should the DAS not identify the OFDA in the OFDA table for user U, then the DAS determines whether the passcode P in the OFDA is valid 528 by referencing the current PVA list for user U 530. If "no", then the email is rejected 526. Otherwise, the DAS has received a newly generated OFDA, and therefore the DAS creates a new OFDA record 532 within its databases, including: adding the sender's domain to the table of sender domains 534; adding the OFDA to the table of OFDAs received from senders in domain D 536; and adds the sender to the sender table S(A) for OFDA A 538. Additionally, the OFDA is added to table A(U) 518.

In FIG. 6, protocol for processing the case of a UME is presented. In this example, a mass mailer initially acquires an OFDA A from a sender in domain D 600 and mass mails a UME to the OFDA 602. The DAS 601 receives the email and extracts the username U and passcode P from the OFDA 610. The DAS then checks if the username exists 612 with reference to the user table 614. If so, the DAS determines whether the OFDA exists 616 with reference to the OFDA table for user U 618. If "yes" again, then the DAS determines whether the OFDA has been revoked 620, again with reference to the OFDA table for user U 618. If "no", then the email is delivered 622. Upon receipt of the email, the user determines that the email is a UME and notifies the DAS 624. The DAS then revokes the OFDA 626 by removing the sender from table S(A) 628 and mark the OFDA as revoked in table A(U) 618. The DAS optionally proposes to the user to warn legitimate senders to this OFDA 630. If "yes", then the DAS provides the user with a list S(A) of senders for OFDA A 632 with reference to the sender table for OFDA A 628. The user then selects a subset S1 of S(A) and creates a new OFDA A1 for the subset 634. The DAS validates the new disposable email address 636, using one of the current PVAs for the user 638, and sends the new disposable email address A1 to the senders in subset S1 640. Optionally, the DAS may also look up domain D of previous senders for the initial disposable email address A, and propose to an administrator to mass-revoke the OFDAs sent by domain D 642. The mass revocation affects both the table of sender domains 644 and the table of OFDA emails from senders in domain D 646, as well as tables A(U) 618 for all the users who own the revoked OFDAs.

DAS processing protocol for incoming emails (i.e., one embodiment thereof) is further summarized below in pseudocode form:

Receive an email sent to mailbox ID M(U, S, P) where U is a valid user, S is the sender domain tag and P is the passcode.
If M is revoked, reject_email.
If pair (S, P) exists in list A(U) of disposables for user U, this is an existing disposable, send email to user's mailbox.
If S or P is new, check_passode check_passode:

check P against current PVAs:
   If P does not match any of the user's PVA, reject_email.
   if P matches one PVA, accept_email_for delivery accept_email_for_delivery:
   add pair (S, P) of this mailboxID in list A(U) of active disposable addresses for user.
   extract domain name D from email header
   add mailboxID M(U, S, P) to list A(D).
   send email to user's mailbox reject_email:
   tag email as UME and put it in special inbox or delete it
   log U, S and P in attempts log 1. Accept an Email When the DAS receives an incoming email, it checks the mailboxID and extracts the corresponding U, S and P parts. If the username U is invalid, the email is discarded, and the attempt is optionally logged in the UME attempts log.
   If U is valid, the DAS checks the S and P parts:
   If S and P both exist in the database, this means the address is valid and the email is delivered.
   If P is a new, valid passcode matching one of the user's PVAs, the address is validated, the sender's domain D is extracted and the OFDA is added into the list A(U) of active disposable addresses for the user (see FIG. 3A). The OFDA is also added to the list A(D) of addresses used by sender domain D (see FIG. 3B). The message is then delivered.

2. Deliver an Email

The DAS can use a standard header rewriting technique that is common among existing disposable email address systems.

When the message is delivered, its SMTP headers are appended with a unique reference number generated by the DAS. That reference number is associated within the DAS to the mailboxID to which the message was sent. The email message is then sent to the user's mailbox.

When the user replies to the message, the reference number is passed along in the reply back to the DAS. The DAS then retrieves the mailboxID and changes the "From:" and "Reply To:" SMTP headers of the reply so that they match the mailboxID, using well known header rewriting techniques. This way, contacts see the reply coming from the mailboxID to which they sent the email.

3. Tag an Email as Potential UME

If the passcode is incorrect, it could just mean that a contact mistyped an OFDA given, for example, over the phone. However, this is most likely an UME attempt. The DAS maintains statistical counters. When an OFDA is tagged as potential UME, a counter is incremented. If the counter reaches a predetermined count within a certain period, the DAS can start rejecting the UME in order to avoid overloading the email server. For instance, if more than 1% of the emails received within an hour have an incorrect passcode, the DAS should either log the emails instead of delivering them, or discard them altogether. Alternately, the email can be set aside for low-priority examination.

An incorrect passcode P could mean that the mailboxID M(U, S, P) has been compromised. To help determine the severity of an UME attack, the (U, S, P) triplet is logged in an attempts log, along with a timestamp and originating remote email server. Existing log analysis programs can then parse the logs and provide statistics of UME attempts.

4. Alert an Administrator

If the level of UME attempts reaches a certain level, the UME alerts an administrator using the site's procedure (e.g., display a console message, generate a SNMP alert, page someone, etc.).

The DAS can optionally generate an alert if many different users discard OFDAs recently used in incoming emails. It can mean that the users have received UME. The sending domains D associated to the revoked mailbox IDs are then extracted, collated and reported to the administrator. The administrator can then determine if this means the owner of domain D has sold its address list and can decide to revoke the whole A(D) list.

DAS User Actions

Each user has a personal mailbox in which the user receives emails from the DAS. Some of the email can be tagged as potential UME, and the user can decide whether to review it or delete the potential UME altogether. Normal precaution associated with suspicious emails should be used when examining potential UME (view the email as text only, no HTML rendering or Javascript interpretation, don't open any attachment).

For each username U defined in the DAS, there is an account for the corresponding person. The user can maintain the account by connecting to the DAS through, for example, a web interface.

1. List Existing OFDAs

Each user can list the OFDA of messages the user received. The user can also sort the OFDAs using various criteria (alphabetically by sender, by age of first message received, by age of last message received, by number of emails received, etc.).

2. Revoke OFDAs and Inform Existing Contacts

A user can select one of more OFDAs and revoke them. When an OFDA is revoked, the DAS is informed that this address is now invalid and should be rejected. The DAS updates its database and increments the statistical counter of revoked OFDA in a time period.

If the user suspects an OFDA has been accidentally compromised, the user can optionally send an address change message to the valid contact(s) that used the OFDA and give the entity a new, valid OFDA. The address change message could use a standard template in a regular reply. Human judgment can be exercised to determine if the contacts can understand the address change message. A mailing list, for example, generally has a special administrative email address for subscription address changes.

3. Change PVA

Each user has a list of PVAs active at any given time. The passcode part of a divulged OFDA is checked against the active PVAs only if the OFDA has never been used before, i.e., has not previously been received at the DAS. An existing, valid OFDA is not checked against the PVA list. Therefore, the user can change the PVA list at anytime with no effect on existing, divulged OFDAs.

Typically, a beginning user might select a simple PVA that could turn out to be susceptible to dictionary attacks. Later on, after the user gains experience with the PVA system, the user will move to stronger PVAs.

After the PVAs have been changed, they are used to validate new OFDAs from that point on.

DAS Administrator Actions

An administrator of the DAS can perform the following actions:

View usage statistics. The administrator can see the usual statistics produced by regular email servers. He can also see DAS-specific statistics, such as:
Number of OFDAs;
UME attempts;
Rate of OFDA creation per user and per time period;
Rate of OFDA revocation;
The administrator can also browse and filter the attempts log.
Browse existing OFDAs. The administrator can browse the content of the DAS database:
List A(U) of OFDAs per user;
List A(D) of existing OFDAs per sender domain.
Revoke OFDAs. The administrator can revoke any OFDA in the database. If a domain becomes a source of mass mailing (e.g., a supplier sells or otherwise compromises its email client address), the administrator can also revoke all the addresses in the list A(D) of existing OFDAs used by this domain.
Block users. The administrator can block a user. This means from that point on, the user is not authorized to create new OFDAs. Existing, valid OFDAs can still be delivered, forwarded to another email address, or discarded.

The PVADL Language

In one example, a new XML-based language, PVADL (Passcode Validation Algorithm Description Language) can be employed in implementing the processing protocols disclosed herein. PVADL has the following characteristics:

Its expression syntax is based on the J2EE Expression Language (EL), with Java-based expressions. Reference the above-incorporated publication entitled, "Core JSTL: Mastering the JSP Standard Tag Library".

It has two special exit tags, ACCEPT and REJECT. When a PVADL script is executed, it terminates when one of these tags is encountered. It must encounter one of these tags before it ends. The ACCEPT tag triggers the acceptance of the evaluated passcode, REJECT its rejection.

Literals are defined as in J2EE EL:
Boolean: true and false;
Integer: same as in Java;
Floating point: same as in Java;
String: delimited with single and double quotes. "is escaped as \", 'is escaped as \', and \ is escaped as \\.;
Null: the void expression.

Basic operators are the same as in EL:
Arithmetic: +, − (binary), *, /, %, − (unary);
Logical: and, &&, or, ||, not, !;
Relational: ==, eq, !=, ne, <, lt, >, gt, <=, ge, >=, le.
An extra string operator, ~ (tilde), is used to check a string against a regular expression.
Variables are defined with the var tag using expressions. Ex:

<var Message="Hello World"/>

Variables are accessed by evaluating a string within curly braces and prefixed with a dollar. For example: ${name} for a simple variable or ${name.part.subpart} for a nested variable.
The test operator which can be used in an if tag <pvadl:if test="$ {P.vowel.count <3}"> . . . </pvadl:if>.

Classes of characters. The goal of a PVADL script is to implement an algorithm that determines whether or not the passcode is valid. First, the passcode P is accessible as a special reserved identifier. Second, it is by default broken into substrings according to various character classes (see below). The substrings are accessible as special reserved array S. The default classes can be changed by PVADL statements. The passcode, as part of an email address, should not have non-alphanumerical characters (e.g. punctuation signs). Moreover, all characters of a passcode are mapped to lowercase to allow for some case-insensitive email gateways on the Internet.

Allowed characters are categorized in one or more class:
predefined classes: letter, digit, vowel, consonant
user-defined classes, created by enumeration with the class tag:

<pvadl:class name="MyClass" enum="npqrstvwxz" description="last 10 consonants in alphabet"/> regular expressions: PVADL understands the same regular expression as the IBM Unix System Services regex parser. See IBM manual entitled "z/OS UNIX System Services Command Reference", IBM document number SA22-7802-04 (2002). Classes are noted as the [:xxx:] where xxx is the class name. Examples: [:vowel:], [:MyClass:]. Regular expressions are used with the ~operator.
Example: ${"abcccd"~"ôabc+"} evaluates as true.
Before a PVADL script is evaluated, the namespace is populated with predefined variables:
P, the passcode;
S[n], the substrings of P.
P is normally split into substrings according to two classes: "letter" (a to z) and "digit" (0 to 9). For example, a passcode equal to "bcd123fgaeiklm" is split by default into 3 substrings S[0]="bcd", S[1]="123", S[2]="fgaeiklm".
PVADL scripts can override this default with the "split" tag by specifying the classes used for splitting. For example, after encountering the statement <pvadl:split classes="vowel, consonant, digit"/>, the passcode "bcd123fgaeiklm" is split into five substrings S[0] to S[4]: "bcd", "123", "fg", "aei", "klm". S.length is 5.
Each substring S[i], as well as P, is considered as a nested variable that contains the following properties:
length: number of characters in the substring, or number of elements in an array;
classname: the name of each defined class is a property with two sub-properties:
count: the number of characters that are part of that class;
value, the numerical values of substrings made of digits;
occur[n], the occurrences of the matching characters within the substring.
Example: suppose P is "abcdef12xyza". Then:
The default split gives S[0]="abcdef", S[1]="12", S[2]="xyza".
P.length is 12, S[0].length is 6, S[1].length is 2, S[2].length is 4.
P.letter.count is 10, P.digit.count is 2, P.vowel.count is 4, P.consonant.count is 6.
S[0].vowel.occur[0] (position of first vowel) is 0 (first char), S[0].vowel.occur[0] is 4.
S[3].vowel.occur[0] is 1.

Example of PVADL script:

```
<?xml version="1.0" encoding="UTF-8" standalone="no"?>
<!DOCTYPE PasscodeValidation SYSTEM "PasscodeValidation.dtd">
<PasscodeValidation>
    <AlgorithmName>Simple test algorithm</AlgorithmName>
    <Description>Passcode should have 6 or
        more letters followed by a number greater than 100
    </Description>
    <AlgorithmVersion> 0.01a </AlgorithmVersion>
    <pva>
        var NumberOfParts = S.length;
        var Value = S[1].value;
        if (NumberOfParts == 2) and (Value > 100)) {
        ACCEPT; }
    else {
        REJECT;}
    </pva>
</PasscodeValidation>
```

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of generating a disposable email address comprising:
    constructing a disposable email address by including a hostname domain, a username, a domain tag, and a passcode, wherein the username identifies a user owning the disposable email address at the hostname domain and the domain tag identifies an email sender domain to which the disposable email address is to be given for use in forwarding email from the sender domain to the user at the hostname domain;
    selecting by the user the passcode for the disposable email address using a user chosen algorithm of a plurality of passcode validation algorithms provided to the user, and
    wherein the disposable email address is employed by the user to facilitate reduction in unsolicited mass email.

2. The method of claim 1, wherein the selecting occurs on-the-fly by the user without preregistering or prestoring the disposable email address, and wherein the method further comprises storing the user chosen algorithm of the plurality of passcode validation algorithms for use in verification of the disposable email address when received with an email.

3. The method of claim 1, further comprising repeating the generating of a disposable email address for a plurality of sender domains to produce a plurality of disposable email addresses, and wherein the method further comprises allowing the user to select unique disposable email addresses for different sender domains, the unique disposable email addresses having different domain tags and different passcodes.

4. The method of claim 3, further comprising allowing the user to change the user chosen algorithm of the plurality of passcode validation algorithms when selecting passcodes for different disposable email addresses.

5. The method of claim 1, wherein the disposable email address has the form mailboxID@hostname, and wherein mailboxID includes the username, the domain tag and the passcode, and the hostname is the hostname domain.

6. A method of constructing and processing a disposable email address having a hostname domain, a username, a domain tag and a passcode, the method comprising:
    (i) generating a disposable email address by the user and forwarding the disposable email address to a sender domain, wherein a domain tag in the disposable email address identifies the sender domain to which the disposable email address is forwarded, and wherein the generating comprises selecting by the user a passcode for the disposable email address using a user chosen algorithm of a plurality of passcode validation algorithms provided to the user by a disposable address system;
    (ii) determining whether the disposable email address associated with an email received at the disposable address system is valid, and if so delivering the email to a user at the hostname domain owning the disposable email address;
    (iii) noting by the user that the email associated with the disposable email address comprises an unsolicited mass email and informing the disposable address system that the disposable email address has been compromised; and
    (iv) indicating revocation of the compromised disposable email address at the disposable address system to prevent future emails with that disposable email address from being forwarded to the user by the disposable address system.

7. The method of claim 6, further comprising offering by the disposable address system to warn one or more senders who received the disposable email address from the user that the disposable email address has been compromised.

8. The method of claim 6, further comprising identifying by the disposable address system a sender domain that previously sent email to the compromised disposable email address, and offering to mass revoke other disposable email addresses that accompanied email sent from that sender domain and that are owned by the user or other users at the hostname domain.

9. The method of claim 6, wherein the determining (ii) comprises extracting by the disposable address system a username, a domain tag, and a passcode from the disposable email address, and checking to determine whether the username has been predefined to the disposable address system, and if not, rejecting the email.

10. The method of claim 9, further comprising determining by the disposable address system whether the disposable email address has been previously recorded at the disposable address system, and if not, determining whether the passcode is valid by employing a stored, user chosen passcode algorithm of a plurality of passcode validation algorithms defined to the user, and if the passcode is not valid, rejecting the email, otherwise recording the disposable email address at the disposable address system and delivering the email to the user.

11. The method of claim 10, wherein if the disposable address system determines that the disposable email address has been previously recorded, then the method further comprises determining by the disposable address system whether the disposable email address has been revoked, and if so, quarantining the email as a possible unsolicited mass email, otherwise delivering the email to the user.

12. The method of claim 6, further comprising proposing, by the disposable address system, to warn legitimate sender domains previously receiving the disposable email address from the user that the disposable email address has been revoked, and providing the user with a list of sender domains previously receiving the disposable email address.

13. The method of claim 12, further comprising selecting by the user a subset of sender domains from the list of sender domains provided by the disposable address system, and creating by the user a new disposable email address for the subset of sender domains.

14. The method of claim 13, further comprising validating at the disposable address system the new disposable email address created by the user employing a user chosen passcode validation algorithm of a plurality of passcode validation algorithms defined to the user.

15. The method of claim 14, further comprising forwarding the new disposable email address to the subset of sender domains selected by the user.

16. The method of claim 6, further comprising determining by the disposable address system a list of sender domains previously receiving the disposable email address and offering to mass revoke other disposable email addresses associated with email received from one or more sender domains in the list.

17. A system for generating a disposable email address comprising:
  means for constructing a disposable email address as including a hostname domain, a username, a domain tag, and a passcode, wherein the username identifies a user owning the disposable email address at the hostname domain and the domain tag identifies an email sender domain to which the disposable email address is to be given for use in forwarding email from the sender domain to the user at the hostname domain;
  means for selecting by the user the passcode for the disposable email address using a user chosen algorithm of a plurality of passcode validation algorithms provided to the user; and
  wherein the disposable email address is employed by the user to facilitate reduction in unsolicited mass email.

18. The system of claim 17, wherein the means for selecting occurs on-the-fly by the user without preregistering or prestoring the disposable email address, and wherein the system further comprises means for storing the user chosen algorithm of the plurality of passcode validation algorithms for use in verification of the disposable email address when received with an email.

19. The system of claim 17, further comprising means for repeating the generating of a disposable email address for a plurality of sender domains to produce a plurality of disposable email addresses, and wherein the system further comprises means for allowing the user to select unique disposable email addresses for different sender domains, the unique disposable email addresses having different domain tags and different passcodes.

20. The system of claim 19, further comprising means for allowing the user to change the user chosen algorithm of the plurality of passcode validation algorithms when selecting passcodes for different disposable email addresses.

21. A system for constructing and processing a received disposable email address having a hostname domain, a username, a domain tag and a passcode, the system comprising:
  (i) means for generating a disposable email address by the user and forwarding the disposable email address to a sender domain, wherein a domain tag in the disposable email address identifies the sender domain to which the disposable email address is forwarded, and wherein the means for generating comprises means for selecting by the user a passcode for the disposable email address using a user chosen algorithm of a plurality of passcode validation algorithms provided to the user by a disposable address system;
  (ii) means for determining whether the disposable email address associated with an email received at the disposable address system is valid, and if so for delivering the email to a user at the hostname domain owning the disposable email address;
  (iii) means for identifying by the user that the email associated with the disposable email address comprises an unsolicited mass email and for informing the disposable address system that the disposable email address has been compromised; and
  (iv) means for indicating revocation of the compromised disposable email address at the disposable address system to prevent future emails with that disposable email address from being forwarded to the user by the disposable address system.

22. The system of claim 21, further comprising means for offering by the disposable address system to warn one or more senders who received the disposable email address from the user that the disposable email address has been compromised.

23. The system of claim 21, further comprising means for identifying by the disposable address system a sender domain that previously sent email to the compromised disposable email address, and for offering to mass revoke other disposable email addresses that accompanied email sent from that sender domain and that are owned by the user or other users at the hostname domain.

24. The system of claim 21, further comprising means for determining by the disposable address system whether the disposable email address has been previously recorded at the disposable address system, and if not, for determining whether the passcode is valid by employing a stored, user chosen passcode algorithm of a plurality of passcode validation algorithms defined to the user, and if the passcode is not valid, for rejecting the email, otherwise recording the disposable email address at the disposable address system and delivering the email to the user.

25. The system of claim 24, wherein if the disposable address system determines that the disposable email address has been previously recorded, then the system further comprises means for determining by the disposable address system whether the disposable email address has been revoked, and if so, for quarantining the email as a possible unsolicited mass email, otherwise delivering the email to the user.

26. The system of claim 21, further comprising means for proposing, by the disposable address system, to warn legitimate sender domains previously receiving the disposable email address from the user that the disposable email address has been revoked, and for providing the user with a list of sender domains previously receiving the disposable email address.

27. The system of claim 26, further comprising means for selecting by the user a subset of sender domains from the list of sender domains provided by the disposable address system, and for creating by the user a new disposable email address for the subset of sender domains, and forwarding the new disposable email address to the subset of sender domains selected by the user.

28. The system of claim 21, further comprising means for determining by the disposable address system a list of sender domains previously receiving the disposable email address and for offering to mass revoke other disposable email addresses associated with email received from one or more sender domains in the list.

29. At least one program storage device readable by a machine, embodying at least one program of instructions executable by the machine to perform a method of generating a disposable email address, the method comprising:

constructing a disposable email address by including a hostname domain, a username, a domain tag, and a passcode, wherein the username identifies a user owning the disposable email address at the hostname domain and the domain tag identifies an email sender domain to which the disposable email address is to be given for use in forwarding email from the sender domain to the user at the hostname domain; and selecting by the user, the passcode for the disposable email address using a user chosen algorithm of a plurality of passcode validation algorithms provided to the user; and wherein the disposable email address is employed by the user to facilitate reduction in unsolicited mass email.

30. The at least one program storage device of claim 29, wherein the selecting occurs on-the-fly by the user without preregistering or prestoring the disposable email address, and wherein the method further comprises storing the user chosen algorithm of the plurality of passcode validation algorithms for use in verification of the disposable email address when received with an email.

31. The at least one program storage device of claim 30, further comprising repeating the generating of a disposable email address for a plurality of sender domains to produce a plurality of disposable email addresses, and wherein the method further comprises allowing the user to select unique disposable email addresses for different sender domains, the unique disposable email addresses having different domain tags and different passcodes.

32. At least one program storage device readable by a machine, embodying at least one program of instructions executable by the machine to perform a method of processing a received disposable email address having a hostname domain, a username, a domain tag and a passcode, the method comprising:

(i) generating a disposable email address by the user and forwarding the disposable email address to a sender domain, wherein a domain tag in the disposable email address identifies the sender domain to which the disposable email address is forwarded, and wherein the generating comprises selecting by the user a passcode for the disposable email address using a user chosen algorithm of a plurality of passcode validation algorithms provided to the user by a disposable address system;

(ii) determining whether the disposable email address associated with an email received at the disposable address system is valid, and if so delivering the email to a user at the hostname domain owning the disposable email address;

(iii) noting by the user that the email associated with the disposable email address comprises an unsolicited mass email and informing the disposable address system that the disposable email address has been compromised; and (iv) indicating revocation of the compromised disposable email address at the disposable address system to prevent future emails with that disposable email address from being forwarded to the user by the disposable address system.

33. The at least one program storage device of claim 32, further comprising offering by the disposable address system to warn one or more senders who received the disposable email address from the user that the disposable email address has been compromised.

34. The at least one program storage device of claim 32, further comprising identifying by the disposable address system a sender domain that previously sent email to the compromised disposable email address, and offering to mass revoke other disposable email addresses that accompanied email sent from that sender domain and that are owned by the user or other users at the hostname domain.

* * * * *